(12) United States Patent
Berger (10) Patent No.: US 7,307,225 B2
(45) Date of Patent: Dec. 11, 2007

(54) SUPPORTING FRAME FOR A MONITORING SCALE

(75) Inventor: Hermann Berger, Adenstedt (DE)

(73) Assignee: Mettler-Toledo Garvens GmbH, Giessen (DE)

( * ) Notice: Subject to any disclaimer, the term of this patent is extended or adjusted under 35 U.S.C. 154(b) by 0 days.

(21) Appl. No.: 10/591,699

(22) PCT Filed: Dec. 9, 2004

(86) PCT No.: PCT/EP2004/014124

§ 371 (c)(1),
(2), (4) Date: Sep. 5, 2006

(87) PCT Pub. No.: WO2005/057144

PCT Pub. Date: Jun. 23, 2005

(65) Prior Publication Data

US 2007/0074912 A1      Apr. 5, 2007

(30) Foreign Application Priority Data

Dec. 11, 2003   (DE)   ............................. 103 57 982

(51) Int. Cl.
*G01G 21/28* (2006.01)
(52) U.S. Cl. .................. 177/119; 177/145; 177/244
(58) Field of Classification Search ............. 177/119, 177/145, 238, 244
See application file for complete search history.

(56) References Cited

U.S. PATENT DOCUMENTS

| 3,017,992 | A |   | 1/1962 | Matti |
| 3,869,007 | A | * | 3/1975 | Haggstrom et al. ......... 177/211 |
| 5,304,745 | A |   | 4/1994 | Rusk et al. |
| 6,084,184 | A | * | 7/2000 | Troisi ......................... 177/145 |
| 6,803,529 | B2 | * | 10/2004 | Takahashi ................... 177/119 |

FOREIGN PATENT DOCUMENTS

| AU | 469535 B2 | 2/1976 |
| GB | 2017619 A | 10/1979 |
| WO | WO 9728073 | 8/1997 |

OTHER PUBLICATIONS

Meier, J. (Marketing): "Garvens press texts for the IFFA 2004 trade fair: New Hygiene standard with the GARVENS S3-SHARK" Internet Article, [Online] URL:http://www.garvens.de/pdf/Pressetext_SHARK_english.pdf—the whole document.

* cited by examiner

*Primary Examiner*—Randy W Gibson
(74) *Attorney, Agent, or Firm*—Schwabe, Williamson & Wyatt (57) ABSTRACT

A supporting frame for a monitoring scale is constructed, in its basic form, from a longitudinal supporting frame part (1) and at least one transverse supporting part (2, 2'). Each transverse supporting part (2, 2') may include a flat, plate-shaped transverse part, via which the stand is supported on the ground. Additional supporting frame parts (3, 3', 3"), transverse supports (13.1 to 13.4), and other associated parts may also be provided for additional reinforcement.

16 Claims, 5 Drawing Sheets

SUPPORTING FRAME FOR A MONITORING SCALE

TECHNICAL FIELD

The invention relates to a supporting frame for a monitoring scale which comprises a weighing cell supported on the supporting frame and a weighing belt supported on the weighing cell and moving in a circle in a longitudinal direction for the transport of the goods to be weighed, with, extending in the longitudinal direction, a longitudinal supporting frame part to which, extending in the direction transverse to the longitudinal direction and serving to support the supporting frame on the floor, at least one transverse supporting frame part is fixed as well as to a support for force-locking fixation to a supporting frame part.

BACKGROUND

Monitoring scales of this type are widely known. They serve to check package weights, in particular in the pharmaceutical industry and the food industry. The packages to be checked are fed to an input transport belt and from there transferred to the weighing belt. While they pass through the weighing belt, their weight is registered by the weighing cell. After they have passed through the weighing belt the packages are transported away by an output belt disposed after the weighing belt. Through this dynamic weighing, packages with faulty weights are recognized and ejected by a pushing device transverse to the package transport taking place in the longitudinal direction.

In this dynamic weighing operation vibrations are excited by the transfer of the incoming packages from the input belt to the weighing belt and from the weighing belt to the output belt. An additional source of the excitation of vibrations is the operation of the pushing device. From this follows the requirement for the supporting frame of suppressing these undesired vibrations as much as possible. Another problem consists of the fact that contents of the packages to be weighed, which in particular can be liquid, granular, or powdered, cannot reach the supporting frame due to unavoidable irregularities of operation and thus remain there.

The known supporting frames are elaborate welded constructions of metal rods extending in the longitudinal direction and transverse thereto. They are in need of improvement with regard to the stability necessary for the suppression of vibrations. Furthermore, they are susceptible to contamination and difficult to clean.

SUMMARY OF THE INVENTION

The objective of the invention is to provide a supporting frame of the type stated initially which requires a reduced structural complexity and at the same time has a high stability, low susceptibility to contamination, and is easy to clean. Furthermore, a support which can be fixed to the supporting frame in a force-locking manner should be provided by the invention, said support having low susceptibility to contamination and being easy to clean.

According to the invention this objective with regard to the supporting frame is realized by the fact that the transverse part is configured in the form of a flat plate whose principal plane extends in the direction transverse to the longitudinal direction.

In this supporting frame structure according to the invention the longitudinal part serves as supporting part. It can be designed to be rigid with respect to bending and torsion in such a manner that the stability required for the respective instance of use is achieved. For example, a length of the supporting frame of 300 cm in its longitudinal direction can be realized without difficulty with a round tube in the range of diameters from 250 to 300 mm. The flat plate forming the transverse part has, despite its relatively small dimension in its direction of thickness parallel to the longitudinal direction, sufficient stability because the load acting on the bearing longitudinal part of the supporting frame is diverted by the flat plate essentially in the direction of its principal plane towards the floor on which the supporting frame is set up. Due to this slight thickness the horizontal surface area of the transverse part is almost zero. Thus the risk of contamination remaining on the horizontal surface areas is essentially eliminated. In particular, no liquids remain but rather run off onto the floor.

The arrangement is also extremely advantageous in regard to manufacturing technology. The customer-specific dimensions of the supporting frame are determined by the dimensions of the longitudinal part and the transverse part. The supporting frame dimension in the horizontal direction follows from the corresponding lengthening of the longitudinal part. The height in the vertical direction can be determined by the dimensioning of the transverse part. It can, for example, be cut out of a blank by laser cutting in a particularly simple manner. The plate thickness can, for example, be less than about 10 mm because essentially only vertical forces have to be transmitted.

In a particularly important embodiment it is provided that at each of the two longitudinal ends of the longitudinal part one of the plate-like transverse parts is disposed. Here the two plate-like transverse parts form the vertical head plates of the supporting frame between which the longitudinal part extends and to which it is fastened by its longitudinal ends, e.g., by welding. To the two plate-like transverse parts feet serving to support the supporting frame on the floor can be fastened. These feet can lie directly on the transverse part or be at a distance from it in the longitudinal direction.

In a further development it is provided that at least one additional supporting frame part extending parallel to the longitudinal part and fixed to each of the plate-like transverse parts is provided. In particular, there are four such additional supporting frame parts, each of which is fixed in the area of a corner of each of the essentially rectangular plate-like transverse parts. Each of these additional supporting frame parts can serve for the fixation of components of the monitoring scale. Furthermore, in particular for additional reinforcement of the supporting frame, transverse bars with slight thickness in the longitudinal direction can be provided at certain intervals along the longitudinal direction, said transverse bars being connected to the longitudinal part as well as to at least one of the additional supporting frame parts. The cross section of each of the additional supporting frame parts can clearly be smaller than that of the longitudinal part to which to an overwhelming extent the supporting and stabilizing function of the supporting frame is assigned.

A further advantageous aspect of the invention consists of the fact that the cross section of the longitudinal part and/or each additional transverse part extending parallel thereto is formed in its area facing away from the floor so as to be convex. Due to this convex configuration of the cross-sectional area pointing upwards there are no upwardly pointed horizontal surfaces on which solid or liquid goods to be weighed could remain. Rather the longitudinal part, and, in given cases, each additional supporting frame part extending parallel thereto, have surfaces inclined upwards relative to the horizontal, from which, in given cases, weighed goods falling there slide or flow off. These prerequisites are met in particular for circular cross sections. For rectangular cross sections aligning the cross sectional diagonals so as to be perpendicular to the floor is sufficient to satisfy these prerequisites.

In the scope of the invention it is also provided that the longitudinal part is a hollow tube provided with a filling opening for ballast material. Through the filling of the hollow tube with the ballast material, which, for example, can be a bulk material such as pebbles, the supporting frame mass can be increased significantly and thereby a correspondingly high mass for the suppression of vibrations achieved. Suitable ballast materials such as pebbles are usually available at very economical prices at the location of the setup for the supporting frame. At the same time the supporting frame in the unfilled state, with its significantly reduced weight, can be transported much more easily to its setup location. It has proven itself particularly advantageous if the longitudinal part or hollow tube is filled with a liquid, such as, say, water, where, to obtain desired properties, this liquid can be treated with an additive such as, say, a disinfectant agent. In so doing, the filling with the liquid can also be done in addition to the bulk material.

In this connection it is expedient that the filling opening is formed by an open front side at one longitudinal end of the hollow tube. To the extent that the longitudinal end of the hollow tube is flush with the plate-like transverse part, a closing cover for the filling opening can be fixed by a screw crown to the plate-like transverse part in a simple manner.

With regard to the support for force-locking fixation on a supporting frame part extending in a longitudinal direction, the objective stated initially is realized by the fact that the support comprises two elements at a distance from one another and extending in the direction transverse to the longitudinal direction, each of which comprises two parts supported on supporting frame part areas opposite one another in the transverse direction as well as at least two counter bearing elements extending between the two elements, one of which is supported on the parts supported on one area and the other is supported on the parts supported on the opposite area, and at least one tightening element extending in the transverse direction and pressing the counter bearing elements together.

The support formed according to the invention can be fastened along the supporting frame part at any point and thereby offers the advantage that it can serve to retain components of any dimensions. Its length can be changed easily by simply loosening the tightening element, displacing it along the supporting frame part, and subsequently tightening the tightening element. Furthermore, the two elements at a distance from one another can be designed to be relatively thin in the longitudinal direction so that there are practically no horizontal surfaces on which contamination can settle. It serves the latter purpose, which in an expedient development of each of the two elements extending in the direction transverse to the principal plane is configured in the form of a flat plate, whose principal plane extends in the direction transverse to the longitudinal direction. In this principal plane the two elements can have correspondingly large dimensions and thereby achieve the required strength.\

The force lock between the support and the supporting frame part is promoted in an expedient development by the fact that each of the two elements extending in the longitudinal direction has in its areas supported on the supporting frame part a form complementary to the cross section of the supporting frame part.

Furthermore, it is expedient in regard to strength as well as to avoiding contamination that each of the counter bearing elements has the form of a bolt extending in the longitudinal direction whose two longitudinal ends are connected to one of the parts in question.

It serves simplicity of construction and ease of mounting that the tightening element is configured in the form of a screw bolt whose head is fixed to one counter bearing element and whose shaft is fixed to the other counter bearing element.

BRIEF DESCRIPTION OF THE DRAWINGS

In the following description embodiments of the invention are explained in more detail with reference to the drawings, wherein:

FIG. 1 shows an embodiment of a supporting frame according to the invention from:
(a) perspective view,
(b) side view,
(c) front view, and
(d) view from above;

FIG. 5 shows a support which can be fixed to the supporting frame in a force-locking manner from
(a) a view in the longitudinal direction of the supporting frame;
(b) a view from above, and
(c) a view transverse to the longitudinal direction of the supporting frame;

FIG. 6 illustrates another embodiment of the support from:
(a) a view in the longitudinal direction of the supporting frame, and
(b) a view transverse to the longitudinal direction of the supporting frame.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of at least one embodiment of the present invention is defined by the appended claims and their equivalents.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment, but it may. The phrase "A/B"

means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(A B) or (B)", that is "A" is optional.

A supporting frame represented in FIG. 1 in various views comprises as a longitudinal part a central cylindrical tube 1 whose cylindrical axis determines a longitudinal direction of the supporting frame. The tube 1 is formed so as to be rigid with respect to bending or torsion in such a manner that it ensures a desired bearing strength and stability of the supporting frame. To each of the two longitudinal ends of the tube 1 an essentially square transverse part 2, 2' is welded whose principal plane extends in the direction transverse to the cylindrical axis of the tube 1, where the cylindrical axis runs through a central area of the transverse parts 2, 2'. With the aid of a laser cutting beam the transverse parts 2, 2' are cut out of a sheet metal plate which is very thin in comparison to the length of the central tube 1.

At a radial, relative to the cylindrical axis, distance from the central tube 1 four additional supporting frame parts extend parallel to the longitudinal direction, each of whose longitudinal ends meets the transverse parts 2, 2' in their corner areas and are welded there to the transverse parts 2, 2'. In FIG. 1 three of these additional supporting frame parts are visible and denoted by the reference numbers 3, 3', and 3". The view of the fourth supporting frame part is obstructed by the central tube 1.

The additional supporting frame parts 3, 3', 3" are formed, like the central tube 1, by cylindrical tubes but the cross section of each is smaller than the cross section of the central tube 1. Thus the central tube 1 encompasses an inner, circular disk-like area of each of the two plate-like transverse parts 2, 2' while the four additional supporting frame parts 3, 3', 3" meet together in the edge area of the plate-like transverse parts 2, 2', said edge area encircling this inner area.

To support the supporting frame on the floor, two feet 5, 5' are fastened, e.g., by welding, at a distance from one another to each of the two plate-like transverse parts 2, 2' in its area bordering its outer edge 4 pointing toward the floor. The feet 5, 5' are formed in such a manner that they can be displaced in the vertical direction by their parts pointing toward the floor being able to be screwed more or less deeply into their parts fastened to the transverse parts 2, 2'.

Between the plate-like transverse parts 2, 2' five plate-like lower transverse bars 6.1 to 6.5 are provided which extend parallel to the principal plane of the transverse parts 2, 2' and are disposed in the longitudinal direction at a uniform distance from one another. The lower transverse bars 6.1 or 6.5 directly adjacent to the transverse parts 2, 2' are at the same distance to the transverse parts 2, 2'. The lower transverse bars 6.1 to 6.5 are bordered at their end pointing toward the floor by an essentially straight edge 7 which extends between the two supporting frame parts adjacent to the floor, of which one with the reference 3" is visible in FIG. 1. To these two supporting frame parts each of the lower transverse bars 6.1 to 6.5 is connected, e.g., by welding. A recess somewhat in the form of a semicircle complementary to the cross section of the central tube 1 is formed at one end of the lower transverse bars 6.1 to 6.5, specifically the end opposite the edge 7, and welded to the central tube 1 over the length of this recess. Through this arrangement the lower transverse bars 6.1 to 6.5 act as an additional reinforcement for the supporting frame.

Between the additional supporting frame parts 3', 3", one lying over another in the vertical direction relative to the floor, three retaining plates 8.1 to 8.3 extend. These retaining plates also have only a very slight thickness in the longitudinal direction and run parallel to the principal plane of the transverse parts 2, 2'. Pointing outward in relation to the supporting frame, the vertical outer edge 9 of each retaining plate 8.1 to 8.3 is formed so as to be straight. A recess in the form of a circular arc following the cross section of the central tube 1 is formed in each of the retaining plates 8.1 to 8.3 in their area horizontally opposite the outer edge 9 and connected to the central tube 1, e.g., by welding. There are corresponding connections between each of the retaining plates 8.1 to 8.3 and the two supporting frame parts 3', 3".

A pair of retaining plates 10.1, 10.2 similar to the retaining plates 8.1 to 8.3 is provided on the supporting frame's side horizontally opposite the retaining plates 8.1 to 8.3. The retaining plates 10.1, 10.2 are connected to the upper supporting frame 3 and the lower supporting frame part not visible in FIG. 1 as well as to the central tube 1 in a manner similar to the retaining plates 8.1 to 8.3.

On the upper side of the central tube 1, i.e., the side opposite the floor, in the area of the longitudinal center of the supporting frame, a pair of retaining bars 11.1, 11.2 is disposed which extend parallel to the principal plane of the transverse parts 2, 2'. A recess somewhat in the form of a semicircle complementary to the cross section of the central tube 1 is formed at their side pointing toward the central tube 1 and they are welded along this recess to the central tube 1. Their end opposite thereto is formed so as to be straight and runs in the horizontal direction.

Extending on the side, in the sense of the longitudinal direction, of the retaining bars 11.1, 11.2 and parallel to the principal plane of the transverse parts 2, 2' is a pair of upper transverse bars 12.1, 12.2 which are formed so as to be essentially mirror-symmetric, relative to the cylindrical axis of the central tube 1, to the lower transverse bars 6.1 to 6.5 and are fastened in a manner analogous to them to the central tube 1 and the two upper supporting frame parts 3, 3'.

Furthermore, a total of four supports 13.1 to 13.4, whose construction and fastening to the supporting frame parts 3, 3' is still to be described in more detail, extend between the two upper supporting frame parts 3, 3' parallel to the principal plane of the plate-like transverse parts 2, 2'.

In FIG. 2 the supporting frame represented in FIG. 1 is equipped with the following components. On the retaining bars 11.1, 11.2 a weighing cell 14 is mounted on which a weighing belt 15 moving in a circle in the longitudinal direction is supported. The weighing cell 14 is connected to a control and evaluation device which supports the operation of the monitoring scale. This control and evaluation device is accommodated in a housing 16 which is fastened to the lateral retaining plates 10.1, 10.2.

When the monitoring scale is operating, packages are put onto the weighing belt 15 and weighed dynamically by means of the weighing cell 14 during their transport by the weighing belt 15, whose transport direction runs in the views of FIG. 2 from right to left. The packages are fed via an input belt 17 disposed in front, in the sense of the direction of transport, of the weighing belt 15. This input belt is mounted on the two supports 13.3 and 13.4. The output end of the input belt 17 borders on the input end of a transport belt 18 of a metal detector 19 formed in the manner of a tunnel, said transport belt also moving in a circle in the longitudinal direction. In this manner the transport belt 18 accepts the packages fed from the input belt 17 and conducts them through the metal detector 19 to the output end of the transport belt 18. The latter borders the input end of the weighing belt 15 and thereby transfers the packages onto the weighing belt 15. This metal detector 19 is mounted on the upper transverse bars 12.1, 12.2.

The input end of an output belt 20 borders on the output end of the weighing belt 15, said output belt accepting the weighed packages from the weighing belt 15 and conveying them away in the longitudinal direction. The output belt 20 is supported on the supports 13.1 and 13.2.

Along the output belt 20 two reject containers 21, 22 are set between the lateral retaining plates 8.1 to 8.2 or 8.2 to 8.3. Into these reject containers, with the aid of pushing devices not represented which are active transverse to the transport direction of the output belt 20 and are controlled by the control and evaluation device disposed in the housing 16, those packages are ejected for which the metal detector 19 has responded or which were recognized as defective as a result of the dynamic weighing by means of the weighing cell 14.

Figure 3:
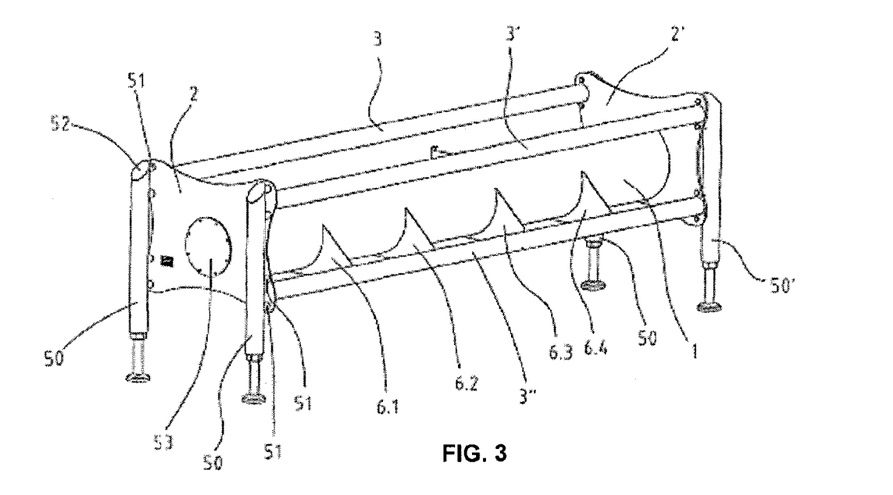
FIG. 3 illustrates a perspective view of another embodiment in a basic outfitting.

The supporting frame's embodiment represented in FIG. 3 differs from the embodiment represented in FIGS. 1 and 2 by the fact that in FIG. 3 the feet 50, 50' are disposed relative to the longitudinal direction of the supporting frame at a small distance in front of the plate-like transverse parts 2, 2'. This distance is set by the distancing elements 51 which extend between the respective feet 50, 50' and the respective transverse parts 2, 2' in the longitudinal direction of the supporting frame. An additional difference consists of the fact that the feet 50, 50' extend in the form of a column essentially over the entire vertical height of the transverse parts 2, 2'. In other respects, the supporting frame represented in FIG. 3 can include all the outfitting elements represented in FIGS. 1 and 2. In the state of outfitting represented in FIG. 3 the additional supporting frame parts 3, 3', 3" also present in the embodiment of FIG. 1 and 2 can be seen. Furthermore, FIG. 3 shows the lower transverse bars 6.1 to 6.4 which are also present in FIGS. 1 and 2 and differ from FIGS. 1 and 2 only with regard to their number. In comparison to FIGS. 1 and 2, in FIG. 3 the edges of the transverse parts 2, 2' of the corners are formed running slightly inwards in the form of an arc. The fastening of the feet 50, 50' to the transverse parts 2, 2' lies in the area of the corners. The upper ends 52 of the feet 50, 50' are formed as surfaces inclined with respect to the horizontal so that also there no debris can be left behind.

Furthermore, a cover 53 having the form of a circular disk can be seen on the plate-like transverse part 2 in FIG. 3. This cover closes the open front side of the hollow tube 1 forming the longitudinal part, where a recess has been formed in said front side in the transverse part 2. The cover 53 is tightened firmly on the transverse part 2 by a peripheral screw crown and can be removed by loosening this screw. Then a ballast material, e.g., pebbles, can be filled into the open central tube 1 at its front side and the cover closed once again. Due to its mass increased thereby the ballast-loaded supporting frame causes a correspondingly higher damping of vibration.

Figure 4:
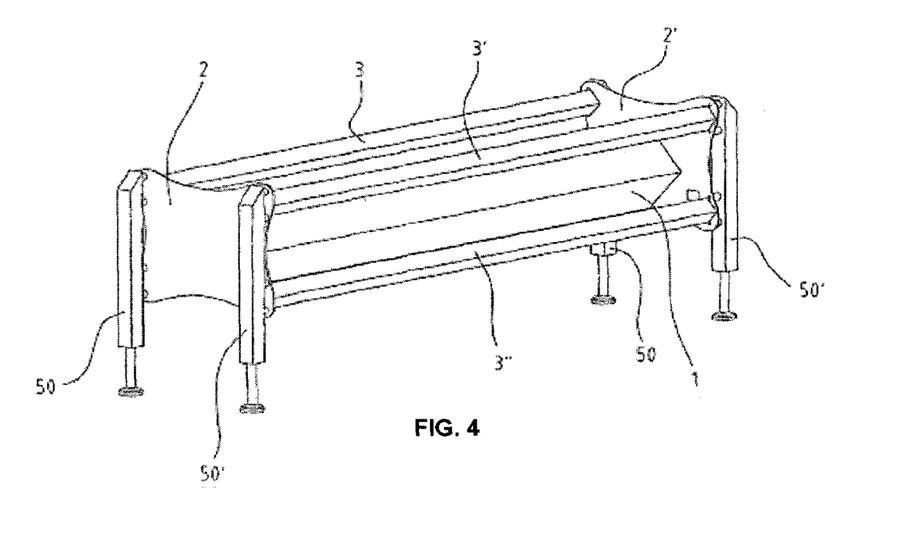
FIG. 4 illustrates a perspective view of an additional embodiment in a basic outfitting.

The supporting frame's embodiment represented in FIG. 4 corresponds to the embodiment represented in FIG. 3 with the exception that, differing from the circular cross sections of the central tube 1, the supporting frame parts 3, 3", 3", and the feet 5, 5' in FIG. 3, these parts in FIG. 4 have a square or rectangular cross section. In order to avoid the accumulation of debris in this case as well, the central tube 1 and the supporting frame parts 3, 3", 3" are aligned in such a manner that the diagonals of their square or rectangular cross sections are aligned vertically, i.e., perpendicular to the floor.

Figure 5A:
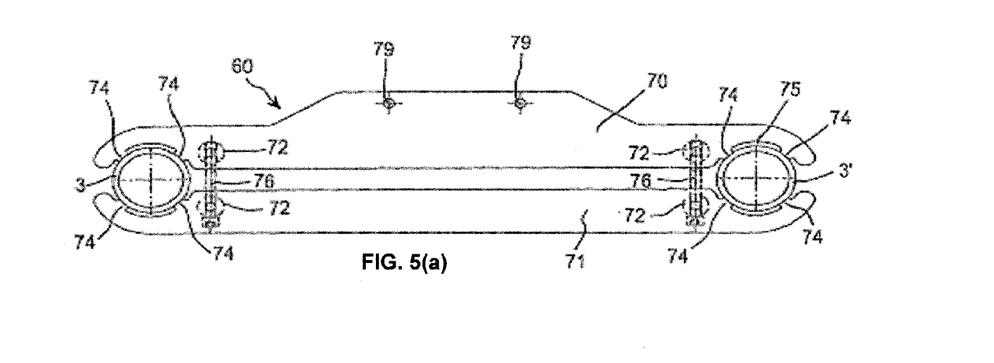
Figure 5B:
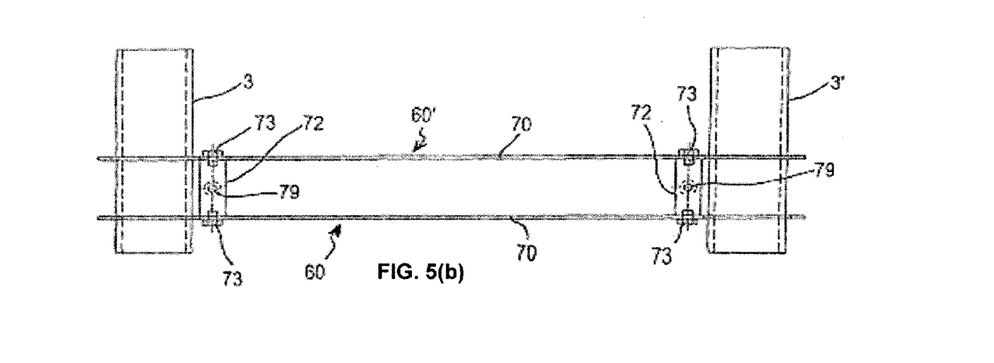

In FIG. 5 an embodiment of the supports 13.1 to 13.4, indicated in FIGS. 1 and 2 only schematically, is represented. The view, seen in the longitudinal direction of the supporting frame, of FIG. 5(*a*) and the upper view of FIG. 5(*b*) show the two upper supporting frame parts 3, 3' and the support fixed thereto in a force-locking manner. The latter comprises according to FIG. 5(*b*) two elements 60, 60', each of which is divided into two parts 70, 71. All of these parts are configured in the form of a flat plate. The principal planes of the parts 70, 71 of the element 60 and the parts 70, 71 of the element 60' are at a distance from one another in the longitudinal direction of the supporting frame and extend in the direction transverse to the longitudinal direction. Along with this, each of the two parts 70 of the elements 60, 60' align with one another in the longitudinal direction, just as the two parts 71 of the elements 60, 60'. Between the parts 70 aligning with one another and the parts 71 aligning with one another a counter bearing element 72, which is fastened by screw bolts 73 at its ends to the respective parts 70 or 71 aligning with one another, extends in each case near the supporting frame parts 3, 3' in the longitudinal direction.

In each of the two elements 60, 60' the respective parts 70, 71 engage around the supporting frame part 3, 3' in question at areas opposite one another in the transverse direction and are supported on the supporting frame part 3, 3' in question by areas 74 formed so as to be complementary to its cross section. In FIG. 5(*a*) each of the parts 70, 71 comprises at each of its areas engaging over a supporting frame part 3, 3' two areas 74 formed so as to be complementary to the cross section of the supporting frame part 3, 3', said areas being separated from one another by a recess 75 lying therebetween.

Figure 5C:
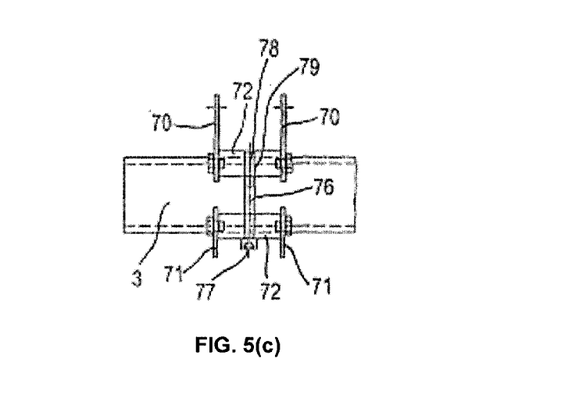

Between the two counter bearing elements 72 of the parts 70, 71 opposite one another, where said counter bearing elements are opposite one another in the vicinity of the supporting frame parts 3, 3' in question, a clamping element in the form of a screw bolt 76 extends. From FIGS. 5(*a*) and 5(*c*) it can be seen clearly that the shaft of this screw bolt 76 is traversed through a radial hole of one of the two counter bearing elements 72 formed as a bolt and is supported on it by its head 77. The shaft's end opposite the head 77 is provided with a screw thread 78 and is screwed into a radial tapped hole of the opposite counter bearing element 72 formed as a bolt. Thereby the two elements 60, 60' are tightened together and clamped fixed to the supporting frame part 3, 3' in question in a force-locking manner.

Figure 1A:
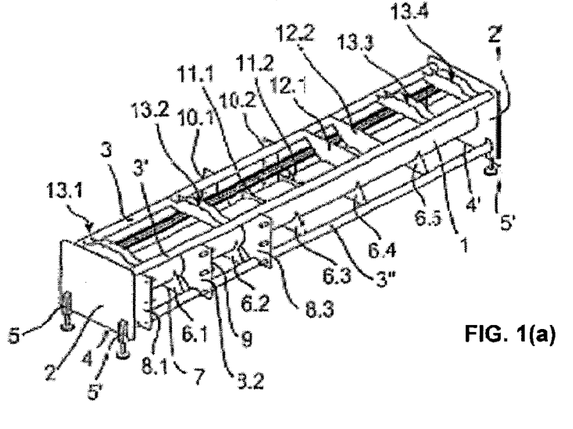
Figure 1B:
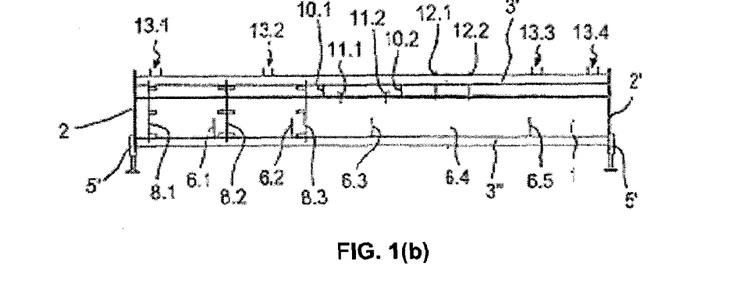
Figure 1C:
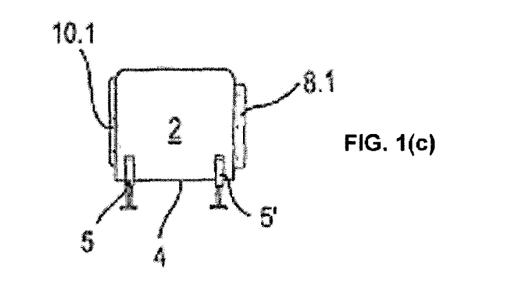
Figure 1D:
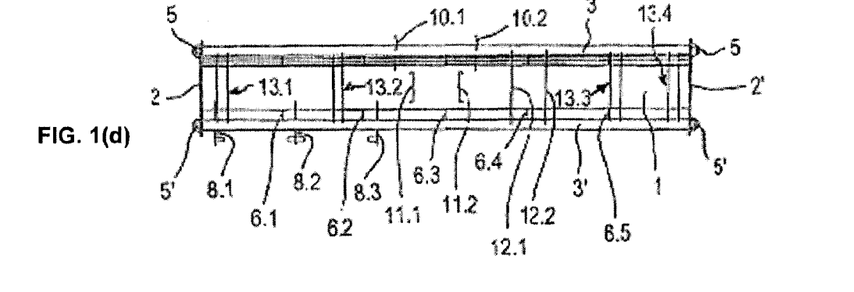
Figure 2A:
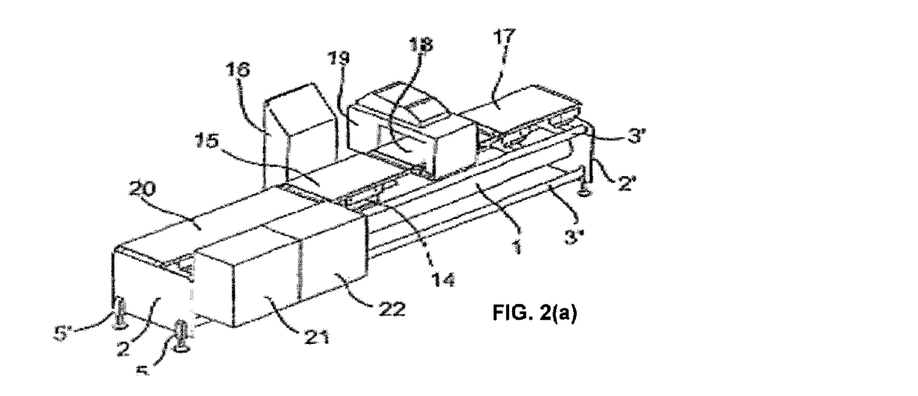
FIG. 2 illustrates the views corresponding to FIGS. 1(a) to 1(d) of the supporting frame with components disposed thereon.
Figure 2B:
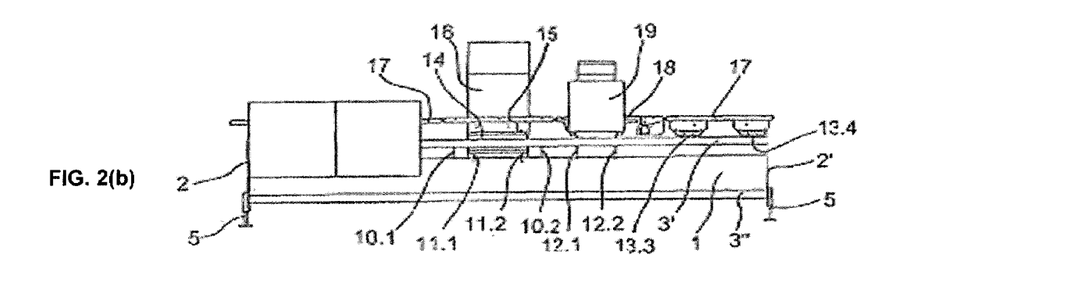
Figure 2C:
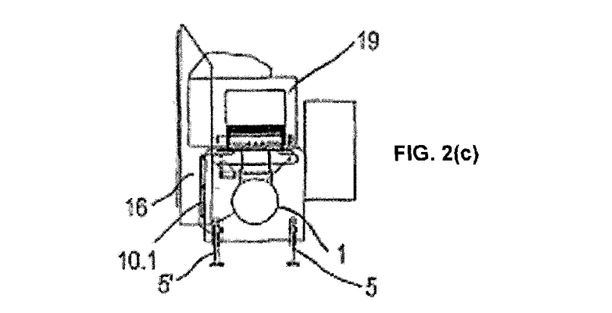
Figure 2D:
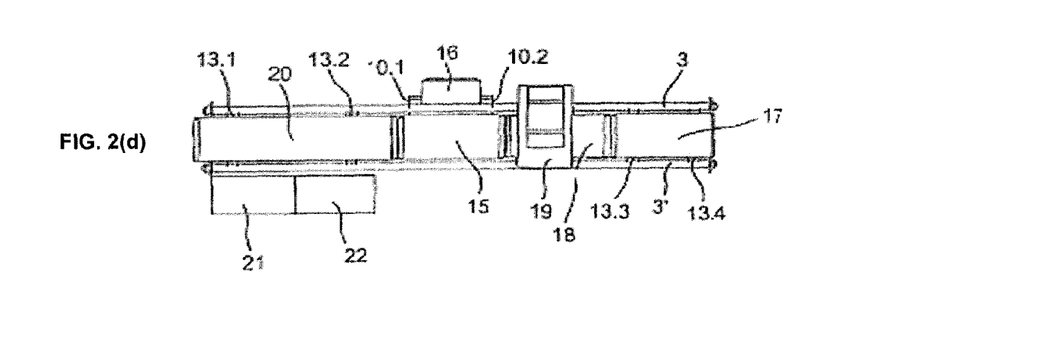

In the parts 70 of the elements 60, 60', said parts being the upper parts in FIG. 5(*a*), mounting holes 79 are formed. These are also indicated in FIG. 1(*a*) on the supports 13.1 to 13.4. They serve for mounting the output belt 20 or input belt 17 visible in FIG. 2.

The support's embodiment represented in FIG. 5 is clamped fast at one end to the supporting frame part 3 and at its other end to the supporting frame part 3'. Here it is sufficient to provide in the vicinity of each of these two clamps a single pair of counter bearing elements 72 and a single tightening element pressing them together. The support's embodiment represented in FIGS. 6(*a*) and 6(*b*) is distinguished from this by the fact that the force-locking connection to the supporting frame part 3 is made only at one end of the support. Its other end projects freely over the supporting frame part 3 and serves for the mounting of the pushing device mentioned above but not represented which acts transversely to the output belt 20 represented in FIG. 2 and ejects faulty packages in the direction of the reject containers 21, 22. A part of this pushing device, whose structure is not of interest for the purposes of the present application, is indicated schematically in FIG. 6(*a*) under the reference number 80.

Figure 6A:
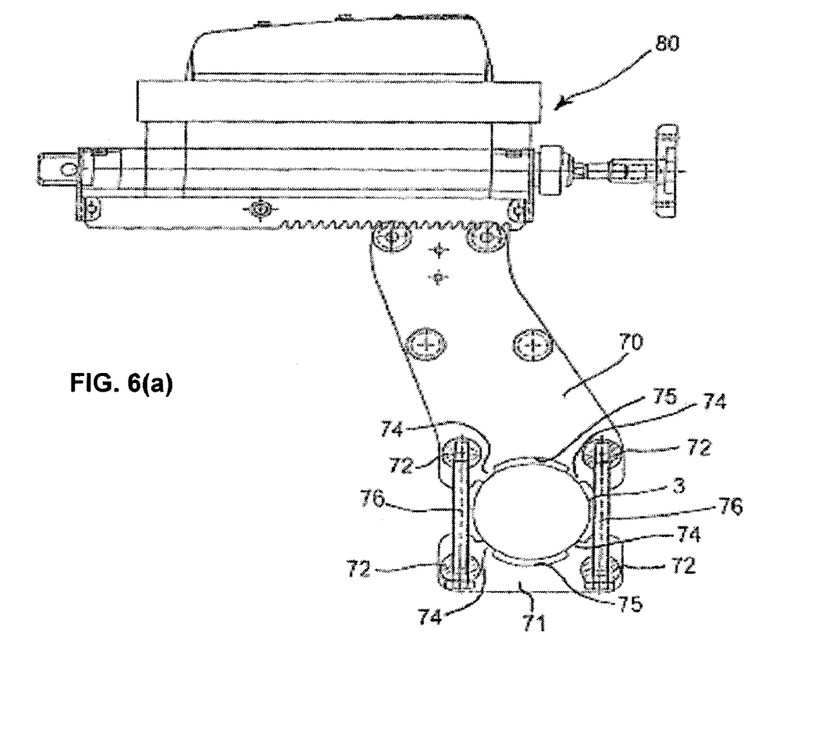
Figure 6B:
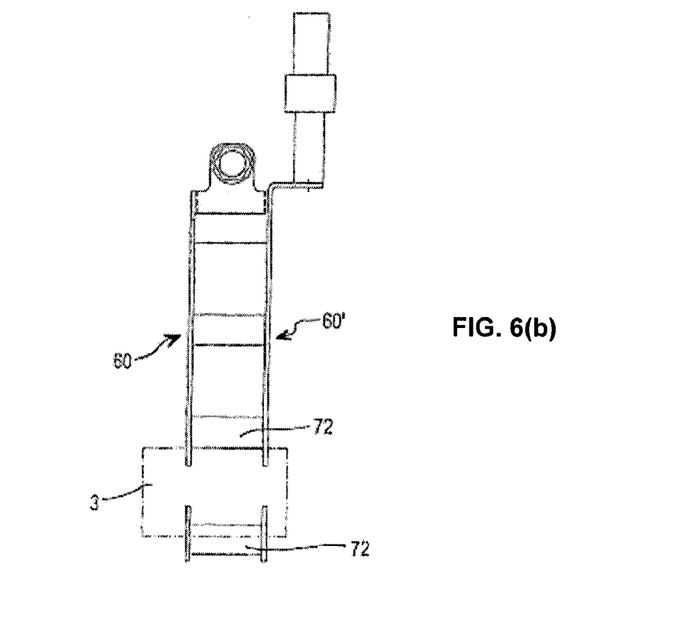

In FIGS. 6(a) and 6(b) the parts corresponding to the elements 60, 60' and their respective parts 70, 71 are denoted by the same reference numbers. To that extent we refer to the description of FIG. 5 relating to this. Furthermore, two pairs of counter bearing elements 72, each pressed together by a screw bolt 76; can be seen in FIG. 6. Each of these pairs of counter bearing elements 72 and screw bolts 76 corresponds to the relevant description of FIG. 5. FIG. 6 is distinguished from FIG. 5 merely to the extent that not only as in FIG. 5 on one side of the respective supporting frame part 3 or 3" one such pair is pressed together by the screw bolts 76 but rather on the opposite side of the supporting frame part 3 in question such a pair of counter bearing elements 72 and a screw bolt 76 pressing these counter bearing elements 72 together provides for a firm seat of the clamping connection.

The invention claimed is:

1. A supporting frame for a monitoring scale, comprising:
a longitudinal supporting frame part;
at least one transverse supporting frame part fixed to the longitudinal supporting frame part and having a flat plate whose principal plane extends in a direction transverse to a longitudinal direction, the at least one transverse supporting frame part configured to support the supporting frame on the floor;
a weighing cell supported on the supporting frame; and
a weighing belt supported on the weighing cell and configured to circulate in a longitudinal direction, wherein the longitudinal supporting frame part is disposed on an inner area of each flat plate of the at least one transverse supporting frame part and each additional supporting frame part extending parallel thereto is disposed on an edge area of each flat plate of the at least one transversed supporting frame part, where said edge area encircles the inner area.

2. Supporting frame according to claim 1, wherein at least one transverse supporting frame part is disposed at each of the two longitudinal ends of the longitudinal supporting frame part.

3. Supporting frame according to claim 1, wherein at least one additional supporting frame park extending parallel to the longitudinal part is fixed to each flat plate of the at least one transverse supporting frame part.

4. Supporting frame according to claim 1, wherein each of the additional supporting frame parts has a cross section smaller than that of the longitudinal part.

5. A supporting frame for a monitoring scale, comprising:
a longitudinal supporting frame part;
at least one transversed supporting frame part fixed to the longitudinal supporting frame part and having a flat plate whose principal plane extends in a direction transverse to a longitudinal direction, the at least one transverse supporting frame part configured to support the supporting frame on the floor;
a weighing cell supported on the supporting frame; and
a weighing belt supported on the weighing cell and configured to circulate in a longitudinal direction, wherein the cross section of the longitudinal section and/or each additional supporting frame part extending parallel thereto is formed so as to be convex in its area facing away from the base.

6. A supporting frame for a monitoring scale, comprising:
a longitudinal supporting frame part;
at least one transversed supporting frame part fixed to the longitudinal supporting frame part and having a flat plate whose principal plane extends in a direction transverse to a longitudinal direction, the at least one transverse supporting frame part configured to support the supporting frame on the floor;
a weighing cell supported on the supporting frame; and
a weighing belt supported on the weighing cell and configured to circulate in a longitudinal direction; and
a support for force-locking fixation to the at least one additional supporting frame part the support includes:
two elements separated at a distance from one another in the longitudinal direction, extending in the direction transverse to the longitudinal direction, each element of said two elements includes two parts opposite one another in the transverse direction, supported on areas of the at least one additional supporting frame part,
at least one counterbearing elements extending between the two elements on one of which is supported on the parts supported on one area and the other is supported on the parts supported on the opposite area, and
at least one tightening element extending in the transverse direction and pressing the counterbearing elements together.

7. Supporting frame according to claim 6, wherein each of the two elements extend in the direction transverse to the longitudinal direction and are configured in the form of a flat plate whose principal plane extends in the direction transverse to the longitudinal direction.

8. Supporting frame according to claim 6, wherein each of the two elements extending in the direction transverse to the longitudinal direction have a form complementary to the cross section of the at least one additional supporting frame part in areas supported on the at least one additional supporting frame part.

9. Supporting frame according to claim 6, wherein each of the counterbearing elements have the form of a bolt extending in a longitudinal direction, each bolt having two longitudinal ends connected to one of the parts.

10. Supporting frame according to claim 6, wherein the tightening element is configured to form a screw bolt whose head is fixed to one counterbearing element and whose shaft is fixed to the other counterbearing element.

11. Supporting frame according to one of claim 1, wherein feet serving to support the supporting frame on the floor are fastened to the flat plate of the at least one transverse supporting frame part.

12. Supporting frame according to claim 11, wherein the feet are at a distance from the flat plate of the at least one transverse supporting frame part in the longitudinal direction.

13. Supporting frame according to claim 1, wherein the longitudinal part is a tube which is rigid with respect to bending.

14. Supporting frame according to claim 1, wherein each flat plate of the at least one transverse supporting frame part has an essentially rectangular basic form.

15. Supporting frame according to claim 1, wherein the longitudinal part is a hollow tube provided with a filling opening for a ballast material.

16. Supporting frame according to claim 15, wherein the filling opening is formed by an open front side on a longitudinal end of the hollow tube.

* * * * *